United States Patent [19]
Franklin et al.

[11] Patent Number: 5,883,810
[45] Date of Patent: Mar. 16, 1999

[54] ELECTRONIC ONLINE COMMERCE CARD WITH TRANSACTIONPROXY NUMBER FOR ONLINE TRANSACTIONS

[75] Inventors: D. Chase Franklin, Seattle; Daniel Rosen, Bellevue, both of Wash.

[73] Assignee: Microsoft Corporation, Redmond, Wash.

[21] Appl. No.: 935,486

[22] Filed: Sep. 24, 1997

[51] Int. Cl.⁶ ................................................ G06F 17/00
[52] U.S. Cl. ...................... 364/479.02; 235/379; 235/380
[58] Field of Search .................................... 235/379, 380; 364/479.02

[56] References Cited

U.S. PATENT DOCUMENTS 5,831,862  11/1998  Hetrick et al. ...................... 364/479.02

*Primary Examiner*—Harold I. Pitts
*Attorney, Agent, or Firm*—Lee & Hayes, PLLC

[57] ABSTRACT

An online commerce system facilitates online commerce over a public network using an online commerce card. The "card" does not exist in physical form, but instead exists in digital form. The online commerce card is issued electronically to a customer by an issuing institution. The issued card is assigned a permanent customer account number that is maintained on behalf of the customer at the issuing institution to remove the risk of the number being lost or s stolen. When the customer desires to conduct an online transaction, the customer asks the issuing institution to issue a transaction number for a single transaction. The issuing institution generates a temporary transaction number and associates it with the permanent account number in a data record. The customer receives the transaction number and submits that number to the merchant as a proxy for the customer account number. The transaction number looks like a real card number and the merchant handles the transaction number in the same manner as any regular credit card number. When the merchant submits an request for authorization, the issuing institution recognizes the number as a transaction number for an online commerce card. The issuing institution references the customer account number, using the transaction number as an index, and processes the authorization request using the real customer account number in place of the proxy number. Once the authorization request is processed, the issuing institution once again exchanges the transaction number for the customer account number and sends an authorization reply back to the merchant under the transaction number.

45 Claims, 5 Drawing Sheets

TRANSACTION PHASE

AUTHORIZATION PHASE

ELECTRONIC ONLINE COMMERCE CARD WITH TRANSACTIONPROXY NUMBER FOR ONLINE TRANSACTIONS

TECHNICAL FIELD

This invention relates to systems and methods for facilitating online commerce over a public network (such as the Internet or an Interactive TV/Cable Network) using credit cards, debit cards, and other types of financial/banking cards. More particularly, this invention relates to systems and methods for conducting online transactions using an electronically realizable card that has a private, permanent account number maintained on behalf of a customer by an issuing institution and temporary transaction numbers issued to the customer on a transactional basis without exposure of the permanent account number.

BACKGROUND OF THE INVENTION

Online commerce is experiencing dramatic growth in recent years. More merchants are developing sites on the World Wide Web (or simply "WWW" or "Web") that consumers can access and order goods and/or services. It is fairly common for a consumer to browse a merchant's catalog, select a product, place an order for the product, and pay for the product all electronically over the Internet.

Typically, the consumer pays for the goods and/or services ordered over the Internet with a credit card. During the online transaction, the merchant sends an order form and requests the consumer to enter personal data (e.g., name, address, and telephone number) and credit card information (e.g., account number and expiration date). The consumer returns the completed order form containing the credit card information to the merchant over the Internet. The merchant verifies that the credit card number is valid and can be charged the payment amount. The card verification is usually conducted on a well-established card network, such as the VisaNet® network or the Veriphone® network.

One problem with this traditional online commerce model concerns the security of the credit card data as it travels over the Internet. The credit card information can be intercepted in route, copied into a database, and used to make unauthorized purchases. In an automated environment, an imposter can repeatedly use the stolen credit card data to conduct many online transactions before the consumer ever becomes aware that the credit card data has been stolen.

It would be desirable to develop a new online commerce model that reduces or eliminates the incentive for stealing credit card data. Ideally, a secure online commerce model would render the credit card data hard to steal, and if stolen, worthless to the thief.

Another concern is that any new online commerce model should integrate well with existing proprietary card network systems. There are well-established systems that verify credit card purchases and subsequently settle accounts. These systems and associated protocols are entrenched in the merchant and banking communities and experience a high level of acceptance and trust. A new online commerce model should not usurp these systems, nor require merchants to change their existing practices to implement completely different systems and protocols.

The inventor has developed a card-based online commerce system that improves security and integrates with existing card verification and settlement systems.

SUMMARY OF THE INVENTION

This invention concerns a system and method for facilitating online commerce over a public network (such as the Internet or Interactive TV/Cable Network) using an online commerce card. The "card" of this system does not exist in physical form, but instead exists in a digital form that can be electronically realized for online commerce.

The online commerce card is issued electronically to a customer by an issuing institution, such as a bank or third party certifying authority. The issued card is assigned a permanent customer account number that is maintained on behalf of the customer by the issuing institution. The customer account number is not given to the customer to remove the risk of that number being lost or stolen.

When the customer desires to conduct an online transaction, the customer sends a request to the issuing institution to issue a transaction number for a single transaction. The issuing institution generates a temporary transaction number and associates it with the permanent account number in a data record. The customer receives the transaction number and submits that number to the merchant as a proxy for the customer account number during the transaction.

The transaction number looks like a real card number (i.e., it has the same format and number of digits as a regular credit card). To the merchant, the transaction number is treated the same as any regular credit card number. The merchant handles the proxy transaction number according to traditional protocols, including seeking authorization from the issuing institution to honor the card number.

During the authorization phase, the issuing institution recognizes the number as a transaction number for an online commerce card. The issuing institution references the customer account number associated with the online commerce card, using the transaction number as an index to the appropriate data record, and processes the authorization request using the card's true customer account number. In this manner, the issuing institution can use its existing processing system to check account information, spending limits, and so forth. Once the authorization request is processed, the issuing institution once again exchanges the card's transaction number for the card's customer account number and sends an authorization reply back to the merchant under the transaction number.

As a result, the merchant never needs to know if the number is a legitimate account number, or a proxy number for an account number. The merchant does not need to implement any new devices, software, or protocols to participate in the new online commerce system.

For added security, the transaction number can be linked to extra transaction information to ensure that the number is only used for one specific transaction. For instance, the issuing institution might tie the transaction number to a specific purchase amount and a particular merchant ID. The issuing institution might further impose a short expiration term on the transaction number so that the number becomes invalid after the expiration term lapses.

The online commerce system substantially reduces the value of a stolen number since the transaction number that is transmitted over the Internet (or other network) is only a proxy number for a single purchase. Stealing the proxy number would not greatly benefit a thief because it cannot be repeatedly used for other purchases or transactions. In addition, the system seamlessly integrates with existing card verification and settlement protocols. Software modules are implemented at the customer and issuing institution, but no additional components are implemented at the merchant, settlement participants, or any other member in the online commerce transaction.

BRIEF DESCRIPTION OF THE DRAWINGS

The same reference numbers are used throughout the figures to reference like components and features.

FIG. 2 shows an information exchange between the customer computing unit and the bank computing center during an online commerce card registration phase.

FIG. 5 shows an information exchange between the merchant computing unit and the bank computing center during a payment authorization phase.

DETAILED DESCRIPTION

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (with a second edition in 1996), which is hereby incorporated by reference.

Figure 1:
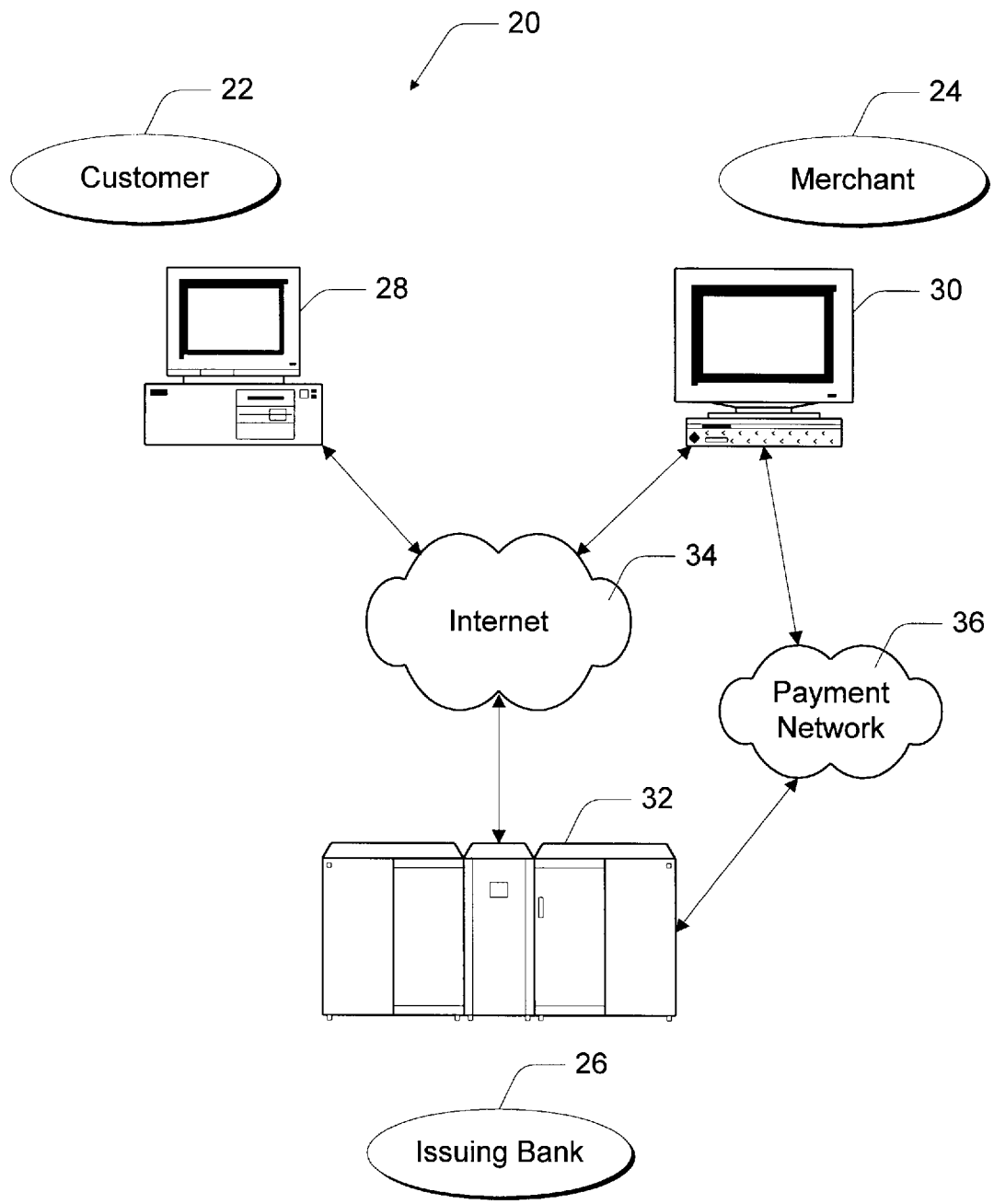
FIG. 1 is diagrammatic illustration of an online commerce system.

FIG. 1 shows an online commerce system 20 for conducting online commerce transactions. For general discussion purposes, three participants to an online commerce transaction are shown: a customer 22, a merchant 24, and an issuing bank 26. These three participants play the primary roles in the online commerce transaction. The customer and merchant may represent individual people, entities, or businesses. Although labeled as a "bank", the issuing bank 26 may represent other types of card-issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The customer 22 has a computing unit 28 in the form of a personal computer, although other types of computing units may be used including laptops, notebooks, handheld computers, set-top boxes, and the like. The merchant 24 has a computing unit 30 implemented in the form of a computer server, although other implementations are possible. The bank 26 has a computing center 32 shown as a mainframe computer. However, the bank computing center 32 may be implemented in other forms, such as a minicomputer, a PC server, a networked set of computers, and the like.

The computing units 28, 30, and 32 are connected with each other via a data communication network 34. The network 34 is a public network and assumed to be insecure and open to eavesdroppers. In the illustrated implementation, the network is embodied as the Internet. In this context, the computers may or may not be connected to the Internet 34 at all times. For instance, the customer computer 28 may employ a modem to occasionally connect to the Internet 34, whereas the bank computing center 32 might maintain a permanent connection to the Internet 34. It is noted that the network 34 may be implemented as other types of networks, such as an interactive television (ITV) network.

The merchant computer 30 and the bank computer 32 are interconnected via a second network, referred to as a "payment network" 36. The payment network 36 represents existing proprietary networks that presently accommodate transactions for credit cards, debit cards, and other types of financial/banking cards. The payment network 36 is closed network that is assumed to be secure from eavesdroppers. Examples of the payment network 36 include the VisaNet® network and the Veriphone® network.

The electronic commerce system 20 is implemented at the customer 22 and issuing bank 26. In the preferred implementation, the electronic commerce system 20 is implemented as computer software modules loaded onto the customer computer 28 and the bank computing center 32. The merchant computer 30 does not require any additional software to participate in the online commerce transaction supported by the online commerce system 20.

General Operation

There are three distinct phases supported by the online commerce system 20: a registration phase, a transaction phase, and a payment authorization phase. During the registration phase, the customer 22 requests an online commerce card from the issuing bank 26. The issuing bank 26 creates an online commerce card for the customer and assigns a permanent customer account number to the card. The permanent customer account number is retained in a data record at the issuing bank 26 and not given to the customer 22. This prevents the customer account number from being stolen while being transferred over the Internet 34 or stored on the customer's computer 28.

The "online commerce card" does not exist in physical form, but in digital form for use in online transactions. The issuing bank 26 issues the card to the customer 22 in the form of a signed digital certificate binding the customer to the bank and a software module that can be invoked when using the commerce card to conduct a transaction on the Internet 34. The commerce card is configured to be used by the customer in one or more areas of commerce in which the customer typically employs a credit card, a debit card, a bank card, or other type of financial services card. The registration phase is described below in more detail with reference to FIG. 2.

During the transaction phase, the customer 22 invokes the software module, which submits a request for a secure card number to the issuing bank 26. The issuing bank generates a random temporary transaction number and associates the transaction number with the permanent customer account number in a data record. The issuing bank 26 issues the transaction number to the customer to use as a proxy for the real customer account number. The transaction number resembles a real account number. In the case of a credit card, for example, the transaction number and real customer account number are both 16-digit, mod 10, numbers identically formatted with four spaced sets of 4-digits. To the customer (and every other participant in the transaction), the transaction number appears to be a valid credit card number. Only the issuing bank 26 differentiates the transaction numbers from the real customer account numbers. The customer 22 uses the proxy transaction number in the transaction with the merchant 24. Since the transaction number is issued in place of the customer number for only a single transaction and with a limited life, a thief that intercepts the transaction number is prevented from using it for illicit gain. The transaction phase is described below in more detail with reference to FIG. 3.

During the payment authorization phase, the merchant 24 submits the transaction number over the conventional payment network 36 to the issuing bank 26 for approval. The issuing bank 26 identifies the number as a transaction number, as opposed to a real customer account number. The issuing bank 26 uses the transaction number to retrieve the data record linking the transaction number to a customer account number. The issuing bank 26 then swaps the customer account number for the transaction number and processes the authorization request using its conventional processing system. After the processing, the issuing bank 26 substitutes the transaction number back for the customer account number and returns the authorization reply to the merchant 24 under the transaction number. In this manner, only the issuing bank is aware that the transaction number is a proxy for the customer account number. The merchant 24 need not be aware that the transaction number is not a true customer account number, but simply handles the number as it would any other card number. The authorization phase is described below in more detail with reference to FIG. 5.

Registration Phase

Figure 2:
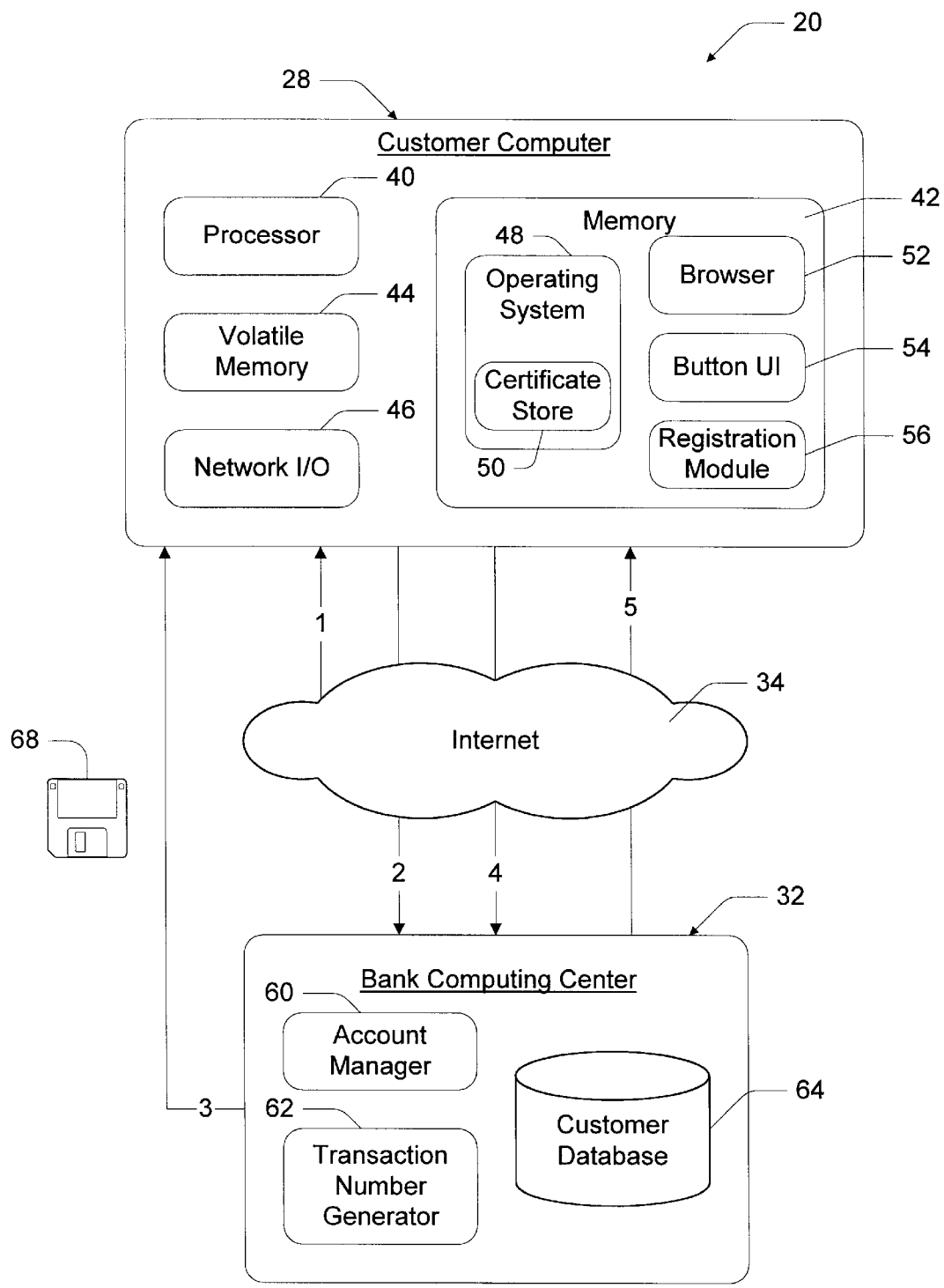
FIG. 2 is a block diagram of a customer computing unit and bank computing center.

FIG. 2 shows the online commerce system 20 during a registration phase. This phase involves the customer 22 requesting an online commerce card from the issuing bank 26, and the issuing bank creating and issuing the online commerce card to the customer. The information exchange between the customer computer 28 and the bank computer 32 during the registration phase are illustrated as enumerated lines between the two entities.

The customer computer 28 has a central processing unit comprising a processor 40, a volatile memory 42 (e.g., RAM), and a non-volatile memory 44 (e.g., ROM, hard disk drive, floppy disk drive, CD-ROM, etc.). The customer computer 28 also has a network I/O 46 (input/output) for accessing the Internet 34. The network I/O 46 can be implemented, for example, as a dial-up modem or as a permanent network connection.

The customer computer 28 runs an operating system 48 that supports multiple applications. The operating system 76 is preferably a multitasking operating system that allows simultaneous execution of multiple applications in a graphical windowing environment. One preferred operating system is a Windows® brand operating system sold by Microsoft Corporation, such as Windows® 95, Windows® NT, Windows® CE, or other derivative versions of Windows®. It is noted, however, that other operating systems that provide windowing environments may be employed, such as the Macintosh operating system from Apple Computer, Inc.

The operating system 48 includes a certificate store 50 to securely hold digital certificates. The certificate store 50 holds a signed certificate received from the issuing bank as part of the online commerce card.

Several software components are stored in memory 42 including a browser 52, a button user interface (UI) 54, and a registration module 56. These software components load into volatile memory when launched and execute on the processor 40 atop the operating system 48. The browser software 52 originally exists on the customer computer 28, whereas the button UI 54 and registration module 56 are downloaded to the customer computer 28 during the registration process. It is further noted that the button UI 54 may be integrated into, or rely on, the graphical user interfaces supported by the operating system 48, but is shown separately for explanation purposes.

The bank computer 32 has an account manager 60, a transaction number generator 62 and a customer database 64. The account manager 60 and transaction number generator 62 are preferably implemented in software that executes on the bank computer 32. The transaction number generator 62 is preferably a random number generator that creates random numbers in the same format as the customer account number. The software modules 60 and 62 may be executed individually or integrated into the same software program, such as a relational database program that manages the relational database 64.

The registration phase between the customer and issuing bank will now be described with respect to FIG. 2. During normal operation on the Web, the customer comes across a banner advertising an online commerce card sponsored by the issuing bank. The banner may be part of the bank's Web site, or part of a statement to its customers, or included as advertisement in other Web content. The customer activates the banner by clicking the banner icon with a mouse pointer. This action submits a request for an online commerce card application. In response, the customer downloads the registration module 56 from the Web to the customer computer 28. This initial registration step is illustrated by flow arrow 1 from the Internet 34 to the customer computer 28.

The registration module 56 automatically launches to aid the customer in the completion of the online application. The registration module is preferably configured to provide step-by-step instructions, such as a Help Wizard. The customer fills out various fields related to personal and financial matters, such as name, address, telephone number, social security number, presently owned credit cards, bank affiliations, and the like.

The customer completes the online commerce card application using the registration wizard and submits the application to the issuing bank (flow arrow 2 in FIG. 2). The registration module 56 facilitates this communication and all future interaction between the consumer and the issuing bank. The application itself, or the registration module 56, contains the necessary routing information to direct the application over the Internet 34 to the bank computing center 32. The issuing bank reviews the application to determine whether the customer is credit worthy 19 and pending the analysis, whether to grant or deny a commerce card. If a new card is denied, the issuing bank returns a message to the customer indicating that the card application has been denied and no card will be issued. Conversely, if a new card is to be granted, the issuing bank returns a message indicating that a card will be granted assuming the remaining registration steps are satisfied.

Assuming that a card account is granted, the issuing bank creates a temporary customer account record in the customer database 64 and assigns a temporary PIN (personal identification number) or other type of customer identifier to that account. The bank supplies the PIN and any additional software needed to complete the formal application process to the customer. In the preferred implementation, the bank supplies the PIN and software using some means other than online transmission. FIG. 2 shows the PIN and software being stored on a floppy disk 68 and mailed to the customer using conventional postal carriers (flow arrow 3 in FIG. 2).

Using regular mail provides an added level of security in that the bank can verify through the mailing address that a customer having the registered name and address truly lives at the place inscribed on the online registration form. This increases the bank's confidence that the customer did not submit a fraudulent application. Another benefit is that the software on floppy disk 68 might contain cryptographic modules to secure communication between the customer and issuing bank. Providing the cryptography on a disk that is mailed to a U.S. address avoids the problem of unknowingly supplying cryptographic code to foreigners in a manner contrary to U.S. export laws.

The customer receives a PIN mailer three to ten days following application submittal. Upon receiving the PIN, the customer invokes the registration module 56 and prepares a "request for a certificate" from the issuing bank. As part of creating the request for certificate, the customer is asked to enter a public key (or one can be provided automatically by the customer computer). The registration wizard 56 generates an associated private key using its own resources, or by calling a cryptographic services library resident on the customer computer. The cryptographic services perform such tasks as encryption, decryption, digital signing, authentication, and hash computations.

The pair of public and private keys is unique to the customer. The public/private keys form the foundation of public cryptography systems and are based upon a mathematical relationship in which one key cannot be calculated (at least in any reasonable amount of time) from the other key. The holder distributes the public key to other parties and maintains the private key in confidence. Public key cryptography is well known. An example of an asymmetric cipher is the well-known RSA cryptographic algorithm named for the creators Rivest, Shamir, and Adleman.

The customer computer 28 submits the certificate request to the issuing bank (flow arrow 4 in FIG. 2). The certificate request contains the public/private key pair and the temporary PIN, which serves as a baseline authentication of the customer requesting the certificate.

If the bank still desires to grant an online commerce card to the customer, the account manager 60 at the issuing bank converts the temporary customer account record to a permanent account record in the database 64. The bank's account manager 60 assigns a permanent customer account number to the customer account record.

The customer account number uniquely associates all relevant database records to a specific customer. The customer account number may exist in many different forms. For instance, if the customer already possesses a real credit card or debit card from the bank, the number from the credit card or debit card is the customer account number used to identify the data record for the online commerce card. In this manner, the customer can use the digital online commerce card concurrently with the physical credit or debit card. As another implementation, the public key, private key, or a mathematical derivation of one or both keys (e.g., a hash value of one or both keys) might be employed to represent the customer account number. Another alternative is for the bank to generate an internal number that is used for solely for record keeping purposes.

The issuing bank digitally signs a certificate containing the public/private key pair and places the customer's public key in the customer account record in the database 64. One technique for forming this digital signature is to hash the certificate and encrypt the resulting hash value using the bank's private signing key. The issuing bank returns the signed certificate to the customer via the Internet 34 (flow arrow 5 in FIG. 2).

The certificate is deposited in the certificate store 50 on the customer computer 28. The certificate and customer's private key act as a password for all future authenticated conversations between customer and issuing bank. Along with the certificate, the issuing bank also downloads the button UI 54, which can be added to the browser's toolbar (and/or toolbars of other applications). The button UI 54 enables the customer to invoke the wizard to communicate with the issuing bank during future commerce transactions. At this point, the customer has been issued an "online commerce card".

The registration process is described as an interaction between the customer and an issuing bank. It is noted that a third party may handle some or all of the registration tasks on behalf of the bank. Such third parties are often referred to as "certifying authorities", "credential binders," "binding authorities," or simply "binders." However, for discussion purposes, the issuing bank is assumed to perform all of the functions of a bank and an issuing institution.

Transaction Phase

Figure 3:
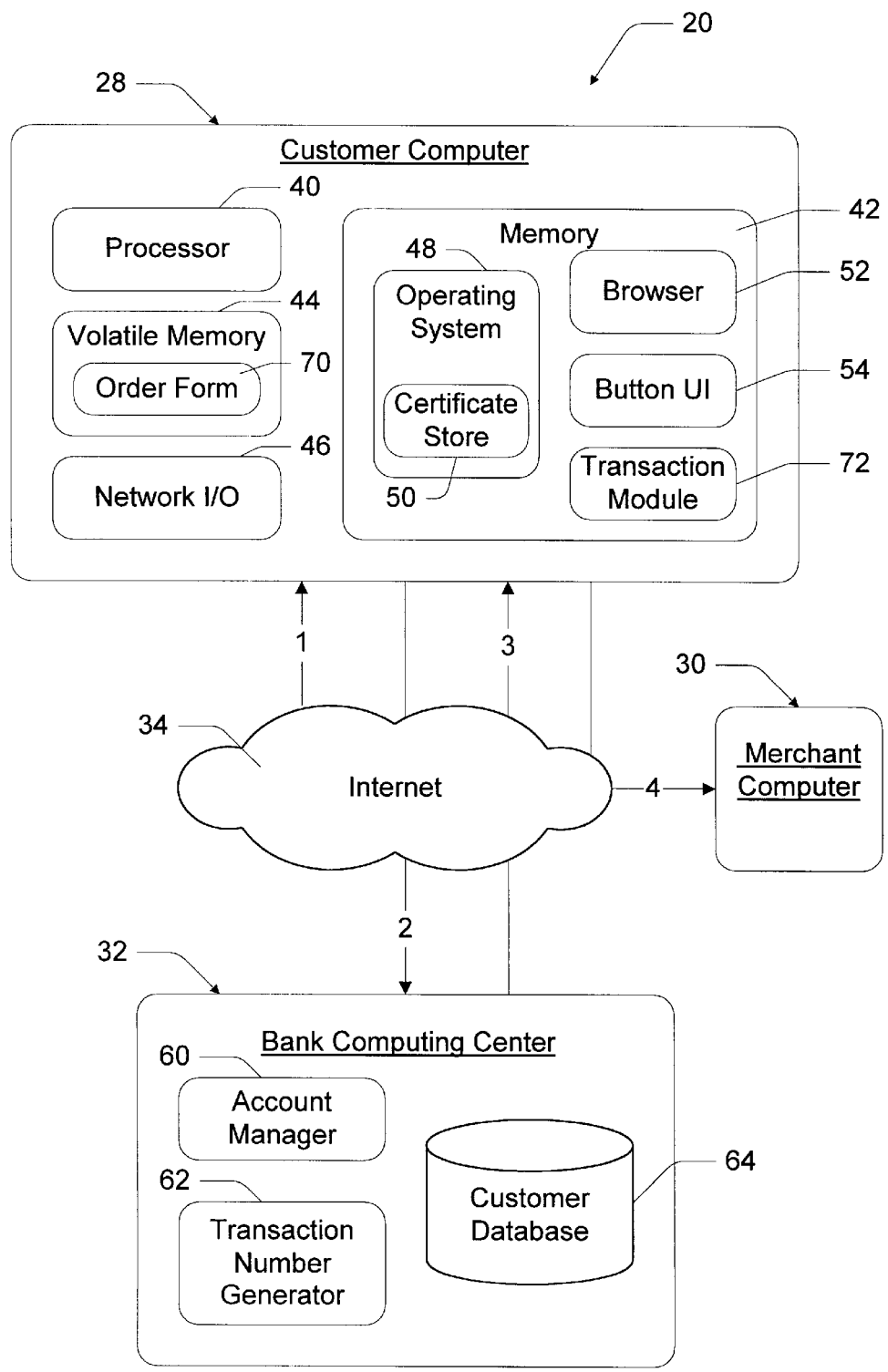
FIG. 3 is the same as FIG. 2, but shows an information exchange between the customer computing unit and the bank computing center during a transaction request phase.

FIG. 3 shows the online commerce system 20 during a transaction phase. This phase involves the customer 22 engaging in an online commerce transaction with the merchant 24. As part of the process, the customer 22 requests a transaction number from the bank 26 to be used in the commerce transaction. The information exchange between the customer computer 28, the merchant computer 30, and the bank computer 32 during the transaction phase are illustrated as enumerated lines.

The customer invokes the browser 52 to surf the Web for a particular product or service, or to visit a Web site of a particular merchant. Suppose that the customer decides to commence an online transaction with the merchant, such as purchasing a product from the merchant. The customer downloads an order form 70 from the Web and stores it in volatile memory 44 (flow arrow 1 in FIG. 3). The order form 70 is typically configured as an HTML (hypertext markup language) form. The customer fills out the order form 70 to purchase a desired product from the merchant. The order form 70 includes a payment section that requires the customer to enter a credit card number for payment of the goods.

Upon reaching this method of payment field, the customer clicks the card button UI 54 on the browser toolbar to invoke a card transaction module 72. The transaction module 72 is the wizard software created as a result of the registration process of FIG. 2 and is employed to guide the customer through a request for a transaction number.

Upon clicking the button UI 54, a dialog box appears on the display to inform the customer that they have requested a secure card number. The customer is prompted by the dialog box to input a password for identification purposes. This password might be the private key (if the customer knows the key value) or it may be a separate name or number created by the customer. The operating system 48 checks the password prior to allowing access to the certificate store 50. If the password is approved, the transaction module 72 prepares a request for a transaction number, digitally signs the request using the customer's private key, and submits the signed request to the issuing bank's computer 32 via the Internet 34 (flow arrow 2 in FIG. 3). The request contains the certificate originally issued by the bank.

The bank computer 32 receives the signed request and immediately verifies the identity and authenticity of the customer by applying the customer's public key to the digital signature and examining the certificate. Assuming the signature and request are valid and the customer's account is in good standing, the account manager 60 instructs the transaction number generator 62 to create a transaction number to be used as a proxy for the customer account number during the online commerce transaction. The account manager 60 associates the transaction number with the customer account number in a data record on the customer database 64. As a result, the online commerce card now has two numbers associated therewith: a permanent customer account number and a transaction number that serves as a proxy for the customer account number.

Figure 4:
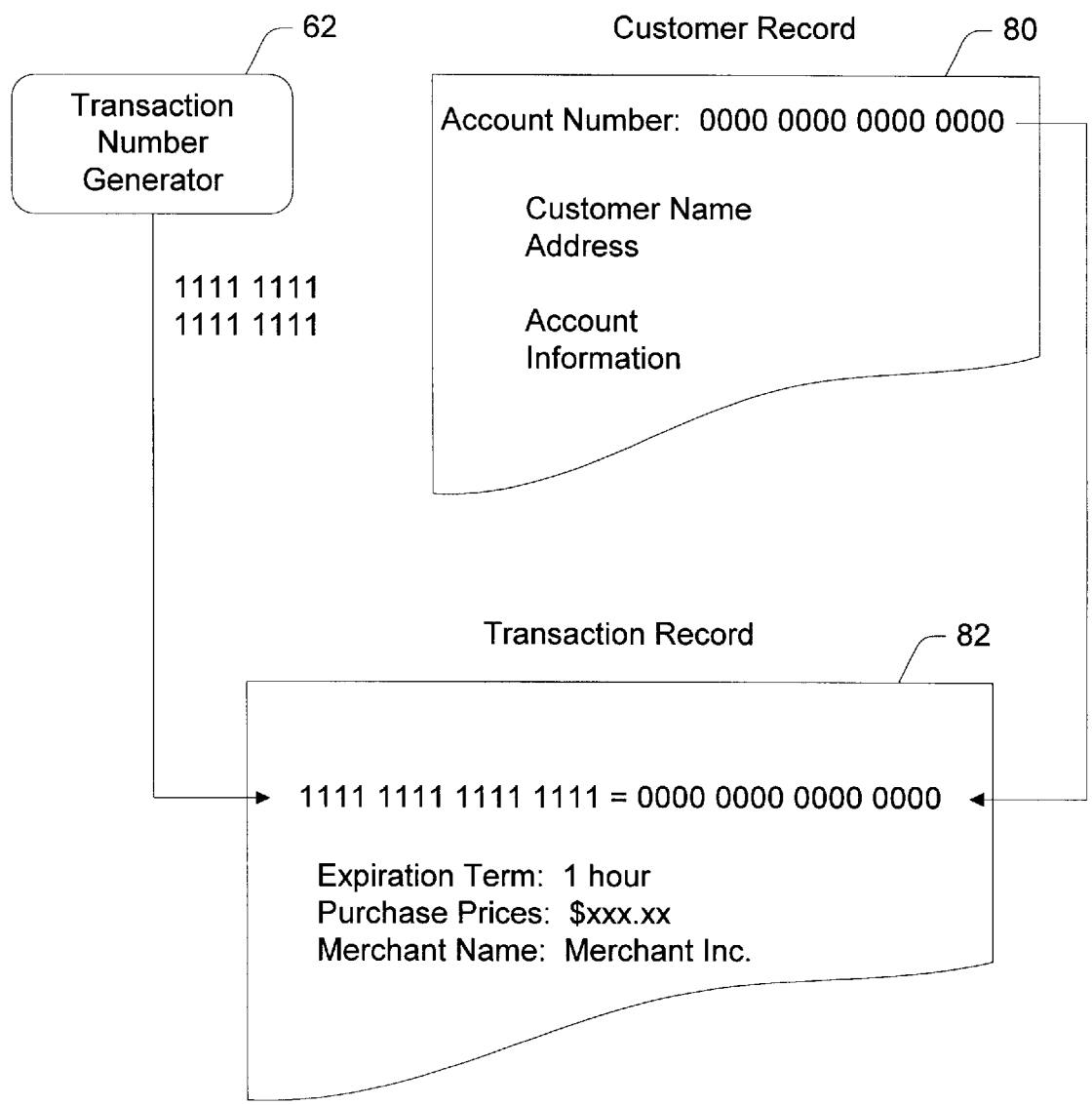
FIG. 4 is a diagrammatic illustration of data records maintained at the bank computing center to associate a permanent customer account number to a temporary transaction number used in an online commerce transaction.

FIG. 4 shows one exemplary implementation of creating a transaction number and associating that number with the customer's account number. A customer record 80 for the requesting customer is stored in the customer database 64 and contains a customer account number. Suppose, for example, the customer account number is a 16-digit credit card number. Credit card numbers comply with a standardized format having four spaced sets of numbers, as represented by the number "0000 0000 0000 0000". The first five-to-seven digits are reserved for processing purposes. It identifies the issuing bank, the card type, and so forth. The last $16^{th}$ digit is used as a sum check for the 16-digit number. The intermediary eight-to-ten digits are used to uniquely identify the customer.

The transaction number generator 62 generates a transaction number for the online commerce card that is formatted identically to the customer account number. In this example, the number generator 62 creates a 16-digit transaction number having four spaced sets of numbers, as represented by the number "1111 1111 1111 1111". The transaction number resembles a credit card number in all respects, except that the first five-seven-digits are coded by the issuing bank to identify the number as a fictitious electronic proxy number, rather than a real credit card number.

The account manager 60 associates the temporary transaction number with the permanent customer account number by relating the two numbers in a data record 82. More particularly, the account manager creates data record 82 in a proxy/customer account cross-reference database. The data record 82 is keyed with the customer account number to identify the customer record 80. The transaction number is then written to the data record 82. In this manner, the customer account record 80 can be cross-referenced via the transaction record 82 using the transaction number as an index. The issuing bank will use the transaction record 82 at a later time when the merchant submits the transaction number for payment authorization.

The transaction number is designed to have a finite life, as determined by the issuing bank. The shorter the duration, the less likelihood of fraud resulting from the transaction number being stolen and reused prior to the end of its life. The chief requirement of the expiration term is that it be sufficiently greater than the anticipated worst case time for returning the authorization request response to the merchant, plus overhead to account for customer and merchant handling prior to submittal of the authorization request. The networks operated by Visa and MasterCard allegedly handle submission and return of an authorization request (round trip from the merchant to the issuing bank and back to the merchant) in less than four seconds, which is essentially negligible compared to the time reserved for customer and merchant handling. Accordingly, a suitable expiration term for a transaction number can be one-half hour to two hours. In FIG. 4, the account manager 60 assigns an expiration term of one hour to the transaction number in record 82. When the expiration term lapses, the transaction number is no longer valid.

The transaction number is valid for only one transaction. For added security, the transaction number can be linked to transaction information to ensure that the number is only used for one specific transaction. The transaction module 72 executing on the customer computer 28 may require the customer to enter information pertaining to the purchase, like the purchase price, the model or item number, the merchant name, and the like. The issuing bank can then tie the transaction number to this specific transaction data within the transaction record 82.

Once the transaction record 82 is created and related to the customer record 80, the issuing bank computer 32 sends the transaction number to the customer computer 28 (flow arrow 3 in FIG. 3). The real customer account number is not sent to the customer, but is retained at the issuing bank in secrecy. In the credit card case, this means that the true credit card number is never sent over the Internet 34, thereby eliminating the possibility of interception and illicit use by a thief.

At the customer computer, the transaction number is presented in a graphical window by the transaction module 72. If the order form is compatible, the customer can click on an icon to have the number automatically entered into the merchant order form 70. Otherwise, in a worst case scenario, the customer manually enters the proxy transaction number into the merchant's HTML order form 70. Since the transaction number has the identical 16-digit format as a real credit card number, the customer enters the 16-digit number as if it were his/her real credit card number.

The user may also be required to enter an expiration date, which may or may not be sent from the issuing bank. Essentially, the expiration date can be any future date that is not too far in the distant future, such as less than two to three years. The customer then submits the completed order form 70 over the Internet 34 to the merchant computer 30.

Authorization Phase

Figure 5:
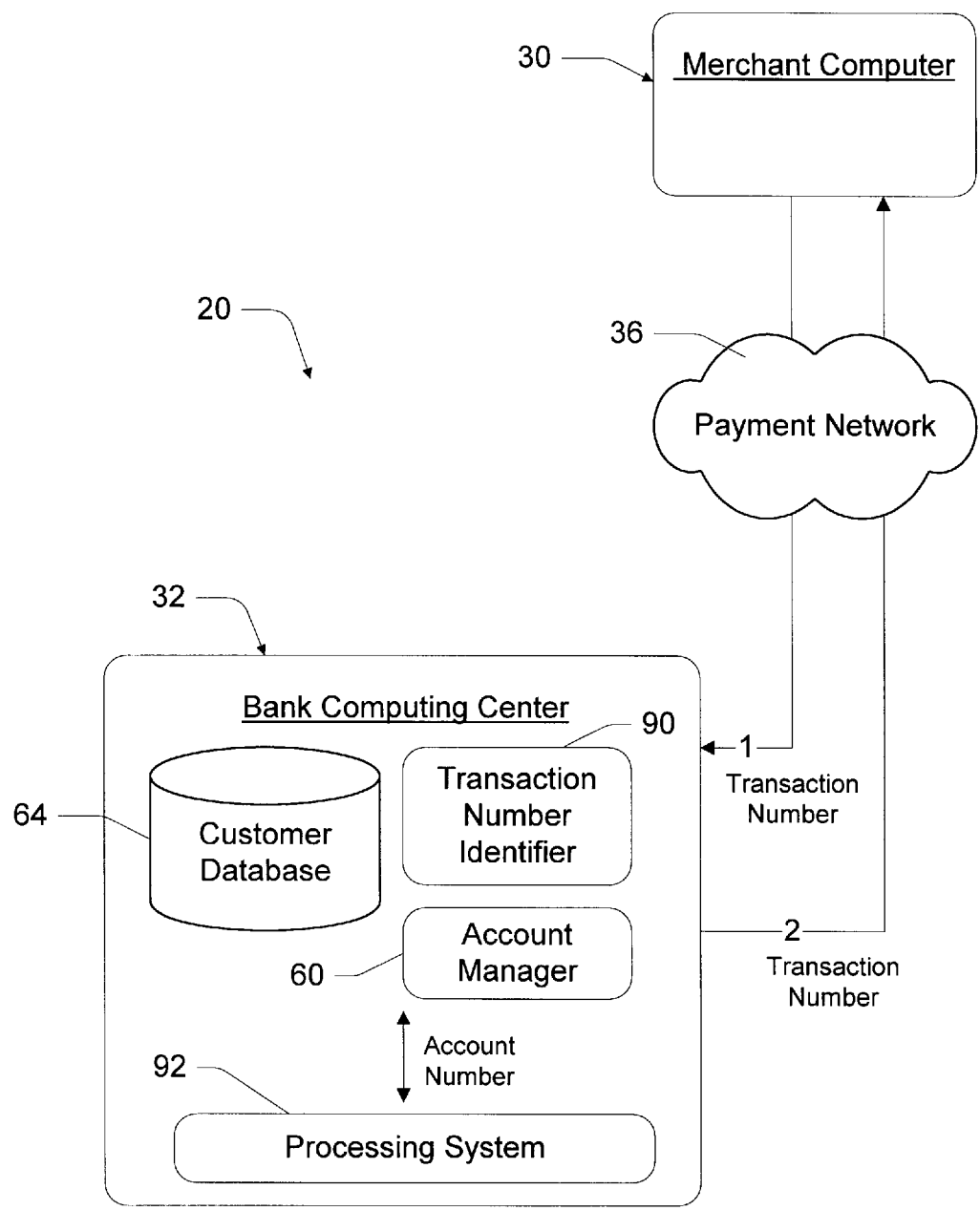
FIG. 5 is a block diagram of the bank computing center and a merchant computing unit.

FIG. 5 shows the online commerce system 20 during a payment authorization phase. This phase involves the merchant 24 seeking authorization from the issuing bank 26 to honor the customer's transaction number received by the merchant in the commerce transaction with the customer. The information exchange between the merchant computer 30 and the bank computer 32 during the authorization phase are illustrated as enumerated lines.

The merchant 30 receives the transaction number from the Internet and processes the transaction number using its existing computer system. There is no software components added to the merchant computer as part of the online commerce system 20. Rather, the merchant computer 30 treats the transaction number of the online commerce card no differently than it treats a standard credit card number. In fact, the merchant computer 30 most likely will not be able to distinguish between the two types of numbers.

In FIG. 5, the merchant computer submits a request for authorization over a payment network 36 to the bank computing center 32 (flow arrow 1 in FIG. 5). This illustration is simplified for discussion purposes, as other participants will most likely be involved. For instance, the merchant computer 30 typically submits the request for authorization to its acquiring bank (not shown) by conventional means. The acquiring bank validates the authorization request by verifying that the merchant is a valid merchant and that the credit card number represents a valid number. The acquiring bank then forwards the authorization request to the issuing bank. The routing to the issuing bank via the payment network is handled through conventional techniques.

When the bank computer 32 receives the authorization request, it first examines the transaction number to determine whether it is a valid number. A transaction number identifier 90 executing at the bank computer 32 examines all incoming account numbers to segregate proxy transaction numbers from real credit card numbers. On a daily basis, it is likely for the bank computer 32 to handle many account numbers on the order of tens or hundreds of thousands. Most of the numbers are expected to be real credit card account numbers. Only a small percentage is anticipated to be temporary transaction numbers. The transaction number identifier 90 filters out authorization requests that pertain to transaction numbers from authorization request that pertain to real customer account numbers. In the continuing example, the transaction number identifier 90 recognizes the number submitted by the merchant computer 30 as a transaction number based on the first five-to-seven digits.

The transaction number identifier 90 passes the transaction number to the account manager 60. The account manager 60 uses the transaction number as an index to transaction records in the customer database 64. If no records are found, the number is deemed invalid and the bank computer 32 returns a message disapproving the transaction to the merchant computer 30. If a record is found, the account manager 60 examines any extra transaction information, such as purchase amount and merchant ID, which is typically included in the authorization request to double check the accuracy of the request.

Once a valid transaction record 82 is located, the account manager 60 cross-references to the associated customer account number and uses this number to index the customer record 80. The account manager 60 substitutes the customer account number in place of the transaction number in the merchant authorization request. The account manager 60 then submits the authorization request to the bank's traditional processing system 92 for normal authorization processing (e.g., confirm account status, credit rating, credit line, etc.).

After the request is processed, the processing system 92 returns an authorization response to the account manager 60. The account manager fetches the transaction number from the cross-referenced data records 80 and 82 in the database 64 and substitutes the transaction number in place of the customer account number in the bank's authorization reply. The bank computing center 32 then returns the authorization reply to the merchant computer 30 via the payment network 36 (flow arrow 2 in FIG. 5).

The preceding steps assume the authorization request was successful. If that is the case, the credit limit of the customer's account is drawn down in the amount of the authorization, and the transaction is logged for future posting.

Settlement

During settlement, batches of transactions are submitted to a card association, which performs the following operations:

Edit/balance the batch transactions
Calculate the interchange fees
Verify the fees
Route chargeback transactions
Calculate net settlement
Distribute interchange files to the issuers
Transmit settlement advisements to the clearing (issuer) banks
Transmit settlement to the settlement (card association) bank The issuing bank receives a daily interchange file that contains all transactions submitted by merchants against customer accounts owned by the issuing bank for that day. In addition, the issuing bank also receives other settlement transactions such as chargebacks, retrieval requests, re-presentments, etc. The settlement process thus far is conventional.

When the settlement file references a transaction number, however, the account manager 60 performs essentially the same lookup-and-substitute process described above with respect to the authorization request. That is, the account manager fetches the customer account number from the cross-referenced records 80, 82 in the database 64, replaces the transaction number in the batch with the customer account number, and processes the batch using conventional means.

The online commerce system has many advantages. One advantage is that it substantially reduces the value of a stolen number since the number is only a proxy number for a single purchase. Stealing the proxy number would not greatly benefit a thief because it cannot be repeatedly used for other purchases or transactions. Another benefit is that the system integrates with existing card verification and settlement protocols. All parties, except the issuing bank, are able to treat the transaction number of the online commerce card in the same manner in which they process a Visa® or Master-Card® transaction today. No additional processing software is needed at the merchants or settlement participants.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method for facilitating online commerce, comprising the following steps:
   issuing an electronic commerce card to a customer during a registration phase, the commerce card having a permanent number associated therewith to identify the customer; and
   during an online commerce transaction phase, issuing a proxy number that is associated with the permanent number for use in an online commerce transaction in place of the permanent number on the commerce card.

2. A method as recited in claim 1, wherein the issuing steps comprise issuing permanent and proxy numbers that are formatted with an equal number of digits.

3. A method as recited in claim 1, wherein the issuing steps are performed online.

4. A method as recited in claim 1, wherein the step of issuing the commerce card comprises the step of supplying to the customer a signed digital certificate and software code that supports a user interface button that invokes a user interface for requesting the proxy number.

5. A method as recited in claim 1, wherein the step of issuing the proxy number comprises the step of issuing a proxy number having a finite period of time within which the proxy number can be used.

6. A method as recited in claim 1, further comprising the step of using the proxy number during the online commerce transaction.

7. A method as recited in claim 1, wherein prior to the step of issuing an electronic commerce card, the method comprises the following additional steps:
   initiating, from the customer, a request for the commerce card from an issuing authority; and
   downloading software code to the customer to assist in a card registration process.

8. A method as recited in claim 1, wherein prior to the step of issuing an electronic commerce card, the method comprises the following additional steps:
   initiating, from the customer, a request for the commerce card from an issuing authority;

supplying a preliminary identifier to the customer; and using the preliminary identifier to request a certificate from the issuing authority, the certificate being part of the commerce card.

9. A method as recited in claim 8, wherein the step of issuing the commerce card comprises the step of supplying to the customer a signed digital certificate and software code that supports a user interface button that invokes a user interface for requesting the proxy number.

10. A graphical user interface embodied on a computer-readable medium that presents the user interface button as recited in claim 9.

11. An electronic commerce card embodiment on a computer-readable medium that is created as a result of the steps in the method as recited in claim 1.

12. A computer-readable medium having computer-executable instructions for performing the steps in the method as recited in claim 1.

13. A computer programmed to perform the steps in the method as recited in claim 1.

14. A method for registering for an online commerce card, comprising the following steps:

initiating, at the customer, a request for an online commerce card application;

downloading software code to the customer to assist in completing the card application;

submitting the application for the commerce card from the customer to the issuing authority; supplying a preliminary customer identifier to the customer;

submitting a request for a certificate from the issuing authority, the request including the preliminary customer identifier to identify the customer;

associating a customer account number with the customer; and downloading a signed digital certificate from the issuing authority to the customer, the signed digital certificate comprising part of the commerce card.

15. A method as recited in claim 14, wherein the supplying step comprises the step of providing the preliminary customer identifier to the customer through means other than online transmission.

16. A method as recited in claim 14, wherein the step of submitting the request for a certificate comprises the following steps:

composing a public key;

generating a private key that is associated with the public key; and submitting a request for certificate that includes the public and private keys.

17. A method as recited in claim 16, further comprising the step of using the signed digital certificate and the private key as a password for communication between the customer and issuing authority.

18. A method as recited in claim 14, further comprising downloading to the customer software code that supports a user interface button to invoke a user interface for facilitating commerce transactions.

19. A graphical user interface embodied on a computer-readable medium that presents the user interface button as recited in claim 18.

20. Computer-readable media resident at the customer and the issuing authority having computer-executable instructions for performing the steps in the method as recited in claim 14.

21. A method for utilizing an online commerce card in conducting online commerce transactions between a customer and a merchant, the commerce card having a permanent customer number associated therewith to identify the customer, comprising the following steps:

submitting a request for a proxy number from the customer to an authority;

generating the proxy number at the authority;

associating the proxy number with the permanent customer number;

issuing the proxy number to the customer; and sending the proxy number, rather than the permanent customer number, to the merchant to commence the online commerce transaction.

22. A method as recited in claim 21, further comprising the following steps:

generating a request that comprises a password unique to the customer;

digitally signing the request at the customer;

submitting the digitally signed request from the customer to the authority; and authenticating the customer from the digitally signed request.

23. A method as recited in claim 21, further comprising the step of displaying the proxy number returned from the authority.

24. Computer-readable media resident at the customer and the authority having computer-executable instructions for performing the steps in the method as recited in claim 21.

25. A computer-implemented method for handling a request for an online commerce transaction number that can be used by a customer in conducting an online commerce transaction, comprising the following steps:

generating a transaction number;

associating the transaction number with a customer number that identifies the customer; and transmitting the transaction number to the customer for use as a proxy for the customer number during the online commerce transaction.

26. A computer-implemented method as recited in claim 25, wherein the associating step comprises the step of creating a record in a database, the record linking the transaction number to the customer number.

27. A computer-implemented method as recited in claim 25, further comprising the step of assigning an expiration time to the transaction number that specifies when the transaction number expires.

28. A computer-readable medium having computer-executable instructions for performing the steps in the computer-implemented method as recited in claim 25.

29. A computer programmed to perform the steps in the computer-implemented method as recited in claim 25.

30. At an authority responsible for authorizing an online commerce transaction involving payment by an electronically transmitted account number, a computer-implemented method for handling an authorization request to honor the account number and accept payment, comprising the following steps:

determining whether the authorization request involves a permanent customer account number or a transaction number that is used as a proxy for the customer account number;

in an event that the authorization request involves a transaction number, performing the following steps:

using the transaction number to cross-reference to an associated customer account number;

substituting the associated customer account number in place of the transaction number; and processing the authorization request using the associated customer account number.

31. A computer-implemented method as recited in claim 30, further comprising the step of accessing a database containing customer account numbers and using the transaction number as an index to the database for locating the associated customer account number.

32. A computer-implemented method as recited in claim 30, wherein after the processing step, the method further comprising the following steps:

substituting the transaction number in place of the customer account number; and replying to the authorization request using the transaction number in lieu of the customer account number.

33. A computer-implemented method as recited in claim 30, further comprising the step of adjusting an account associated with the customer account number to reflect the payment made in the online commerce transaction.

34. A computer-readable medium having computer-executable instructions for performing the steps in the computer-implemented method as recited in claim 30.

35. A computer programmed to perform the steps in the computer-implemented method as recited in claim 30.

36. A method for facilitating online commerce, comprising the following steps:

(A) conducting a registration phase between a customer and an issuing authority comprising the following steps:
  (1) initiating, at the customer, a request for an online commerce card application;
  (2) downloading software code to the customer to assist in completing the card application;
  (3) submitting the application for the commerce card from the customer to the issuing authority;
  (4) supplying a preliminary customer identifier to the customer;
  (5) submitting, from the customer, a request for a certificate from the issuing authority, the request including the preliminary customer identifier to identify the customer; and
  (6) associating a customer account number with the customer; and
  (7) downloading a signed digital certificate from the issuing authority to the customer and software code that supports a user interface button to invoke a user interface for facilitating online commerce transactions, the signed digital certificate and user interface button forming the online commerce card having the customer account number associated therewith;

(B) utilizing the online commerce card to conduct an online commerce transaction phase between the customer and a merchant comprising the following steps:
  (1) submitting a request to use the commerce card from the customer to the issuing authority;
  (2) generating a transaction number;
  (3) associating the transaction number with the customer account number; and
  (4) transmitting the transaction number to the customer for use as a proxy for the customer account number during the online commerce transaction;
  (5) sending the transaction number, rather than the permanent customer number, to the merchant to commence the online commerce transaction;

(C) conducting a payment authorization phase at the issuing authority in response to receiving an authorization request from the merchant to honor the transaction number and accept payment, comprising the following steps:
  (1) identifying the authorization request as involving a transaction number that is used as a proxy for the customer account number;
  (2) using the transaction number to cross-reference to the associated customer account number;
  (3) substituting the associated customer account number in place of the transaction number;
  (4) processing the authorization request using the associated customer account number;
  (5) substituting the transaction number in place of the customer account number; and
  (6) replying to the merchant using the transaction number in lieu of the customer account number.

37. A system for facilitating online commerce, comprising:

a customer computing unit resident at a customer site, the customer computing unit being configured with an online commerce card for use in online commerce transactions, the online commerce card being associated with a customer account number;

an authority computing system resident at an authority site, the authority computing system having a database to hold the customer account number, the authority computing system being configured to generate a transaction number, associate the transaction number with the customer account number in the database and electronically issue the transaction number to the customer computing unit;

the customer computing unit being configured to use the transaction number in an online commerce transaction with a merchant; and the authority computing system being configured to receive from the merchant an authorization request for approval of the transaction number, the authority computing system using the transaction number to cross-reference in the database the associated customer account number and to process the authorization request with the customer account number.

38. A system as recited in claim 37, wherein the customer account and transaction numbers are formatted with an equal number of digits.

39. A system as recited in claim 37, wherein the authority computing system assigns an expiration term to the transaction number so that the transaction number is not valid after the expiration term elapses.

40. A system for issuing online commerce cards used in online commerce transactions, comprising:

a customer account manager to establish a customer account number for a customer and to associate the customer account number to a digital certificate that is unique to the customer, the digital certificate being in embodied in an electronically transmittable form which can be downloaded to the customer for use as an online commerce card;

a transaction number generator to generate a transaction number for an online commerce transaction in which the customer desires to engage; and the customer account manager being configured to associate the transaction number with the customer account number, the transaction number being embodied in an electronically transmittable form which can be downloaded to the customer so that the customer can use the transaction number in the online commerce transaction as a proxy for the customer account number.

41. A software program embodied on a computer-readable medium incorporating the system as recited in claim 40.

42. In an online commerce system, a system for handling an authorization request to approve an electronically transmittable number, comprising:

a transaction number identifier to identify the number as a transaction number that is used as a proxy for a customer account number; and a customer account manager to cross-reference the customer account number using the transaction number and to substitute the transaction number for the customer account number for further processing.

43. A system as recited in claim 42, wherein the customer account manager is configured to reverse substitute the transaction number back for the customer account number after the processing.

44. A software program embodied on a computer-readable medium incorporating the system as recited in claim 42.

45. An electronically realizable commerce card embodied on a computer-readable medium comprising:

a first data field to hold a permanent customer account number having N digits and a predefined format that is recognized as an acceptable card number format;

a second data field to hold a temporary transaction number that serves as a proxy for the customer account number, the transaction number having the N digits and the format identical to the customer account number; and wherein the first and second data fields are related to associate the customer account number with the transaction number.

* * * * *